April 21, 1959 H. T. CARTER ET AL 2,883,457

MULTISTATION TELEPHONE INTERCOMMUNICATING AND CONFERENCE SYSTEM

Filed May 28, 1957 8 Sheets-Sheet 1

INVENTORS H. T. CARTER
S. A. KELNHOFER
BY A. F. Kane
ATTORNEY

INVENTORS H. T. CARTER
S. A. KELNHOFER
BY G. J. Kane
ATTORNEY

INVENTORS H. T. CARTER
S. A. KELNHOFER
BY
A. F. Kane
ATTORNEY

INVENTORS H. T. CARTER
S. A. KELNHOFER
BY A. F. Kane
ATTORNEY

INVENTORS H. T. CARTER
S. A. KELNHOFER
BY A. F. Kane
ATTORNEY

April 21, 1959 H. T. CARTER ET AL 2,883,457
MULTISTATION TELEPHONE INTERCOMMUNICATING AND CONFERENCE SYSTEM Filed May 28, 1957 8 Sheets-Sheet 6

INVENTORS H. T. CARTER
S. A. KELNHOFER
BY Q. F. Kane
ATTORNEY

INVENTORS H. T. CARTER
S. A. KELNHOFER
BY G. F. Kane
ATTORNEY

April 21, 1959 H. T. CARTER ET AL 2,883,457

MULTISTATION TELEPHONE INTERCOMMUNICATING AND CONFERENCE SYSTEM

Filed May 28, 1957 8 Sheets-Sheet 8

INVENTORS. H. T. CARTER
S. A. KELNHOFER
BY G. F. Kane
ATTORNEY

United States Patent Office 2,883,457
Patented Apr. 21, 1959

2,883,457

MULTISTATION TELEPHONE INTERCOMMUNICATING AND CONFERENCE SYSTEM

Herman T. Carter, Madison, and Sylvester A. Kelnhofer, New Providence, N.J., assignors to Bell Telephone Laboratories, Incorporated, New York, N.Y., a corporation of New York Application May 28, 1957, Serial No. 662,079

8 Claims. (Cl. 179—1)

This invention relates to telephone systems and particularly to multistation intercommunicating telephone systems.

It is the object of this invention to provide a simplified and otherwise improved two-wire intercommunicating telephone system of the type in which interstation signaling is effected on an automatic selective basis through the medium of a dial-controlled selector switch or by manually operable keys.

It is common practice in intercommunicating systems to employ a single speech transmitting path and to render such path accessible to all stations of the system for two-way private communication between any two stations. Obviously, such single path frequently tests busy to call-originating stations and the frequency at which such path is found inaccessible to such stations is more significant when the path must serve a large number of stations. In accordance with a particular feature of this invention, the frequency at which a call-originating station encounters a busy condition is materially reduced. This feature results from a combination of circuitry and apparatus which enables two independent conversations to be carried on between stations simultaneously. More particularly, the intercommunicating system of this invention includes a pair of speech transmitting links which may be employed simultaneously, each for communicating purposes between different pairs or groups of stations.

Another feature of the invention contemplates primary and secondary talking links and switching means which initially completes a connection between calling and called stations by way of the primary link, and immediately thereafter transfers the connection to the secondary link if the secondary link is idle. An ancillary feature involves switching means which initially completes a connection between calling and called stations by way of the primary link and maintains such connection in the event the secondary link is busy.

A further feature of the invention which insures an increased availability of the intercommunicating facilities to the involved stations resides in the use of switching means which functions automatically to transfer a call, which is in progress on the primary link, from the primary link to the secondary link immediately upon the secondary link becoming available. This transfer is effected without objectionable interference to the conversation being carried on at the time of transfer.

In accordance with another feature of the invention any station of the intercommunicating system may be equipped not only to effect the automatic signaling of any other station by the dialing of a digital code assigned to such other station, but also to effect the automatic signaling of a certain one or more other stations by means of keys individually identified with such certain one or more stations.

In accordance with a further feature, facilities are provided whereby the station served by the intercommunicating system may include off-premise, or remotely located stations as well as local stations.

In accordance with still another feature, a station of the intercommunicating system may initiate a call, dial a code to selectively signal another station and then reserve or camp-on the system until the desired station is free to answer, or the system is free to take another call. As soon as the desired station becomes free or as soon as the system is available to take another call, the previously selected called station is automatically signaled without further effort on the part of the calling party.

Another feature enables a party at a station to signal other stations connected to the secondary link by means of a flashing lamp signal as a request that the parties utilizing the system disconnect and thus render the intercommunicating facilities available to others.

Still another feature provides for the extension of an incoming central office or private branch exchange line to one or more of the intercommunicating stations.

In accordance with a still further feature, a conference of selected stations may be called through the operation of a number of signaling keys furnished on a one-per-station-per-called-station basis.

These and other features of the invention not specifically identified, will be better understood from the detailed description hereinafter made when read with reference to the accompanying drawings, in which.

Figure 7:
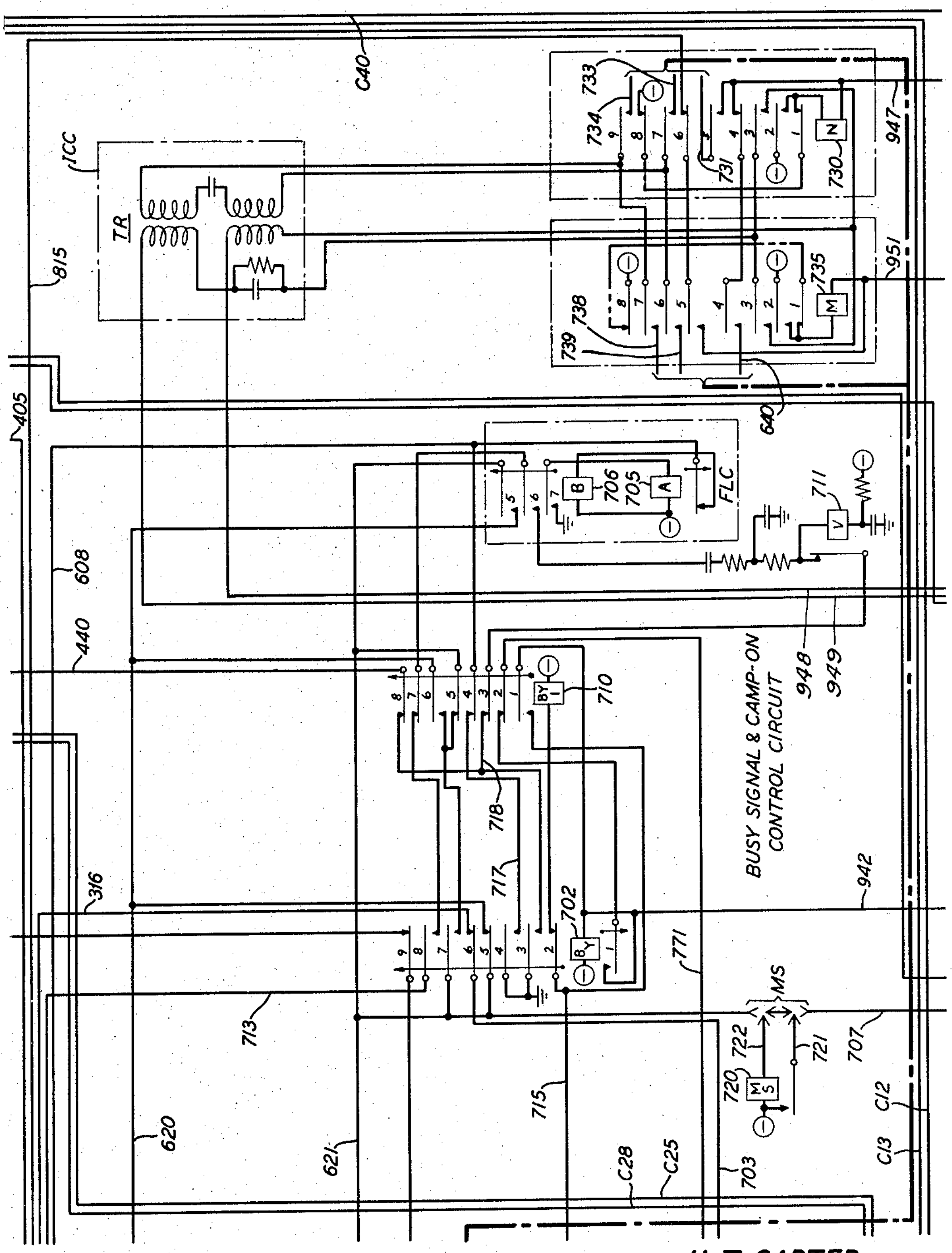
Figure 8:
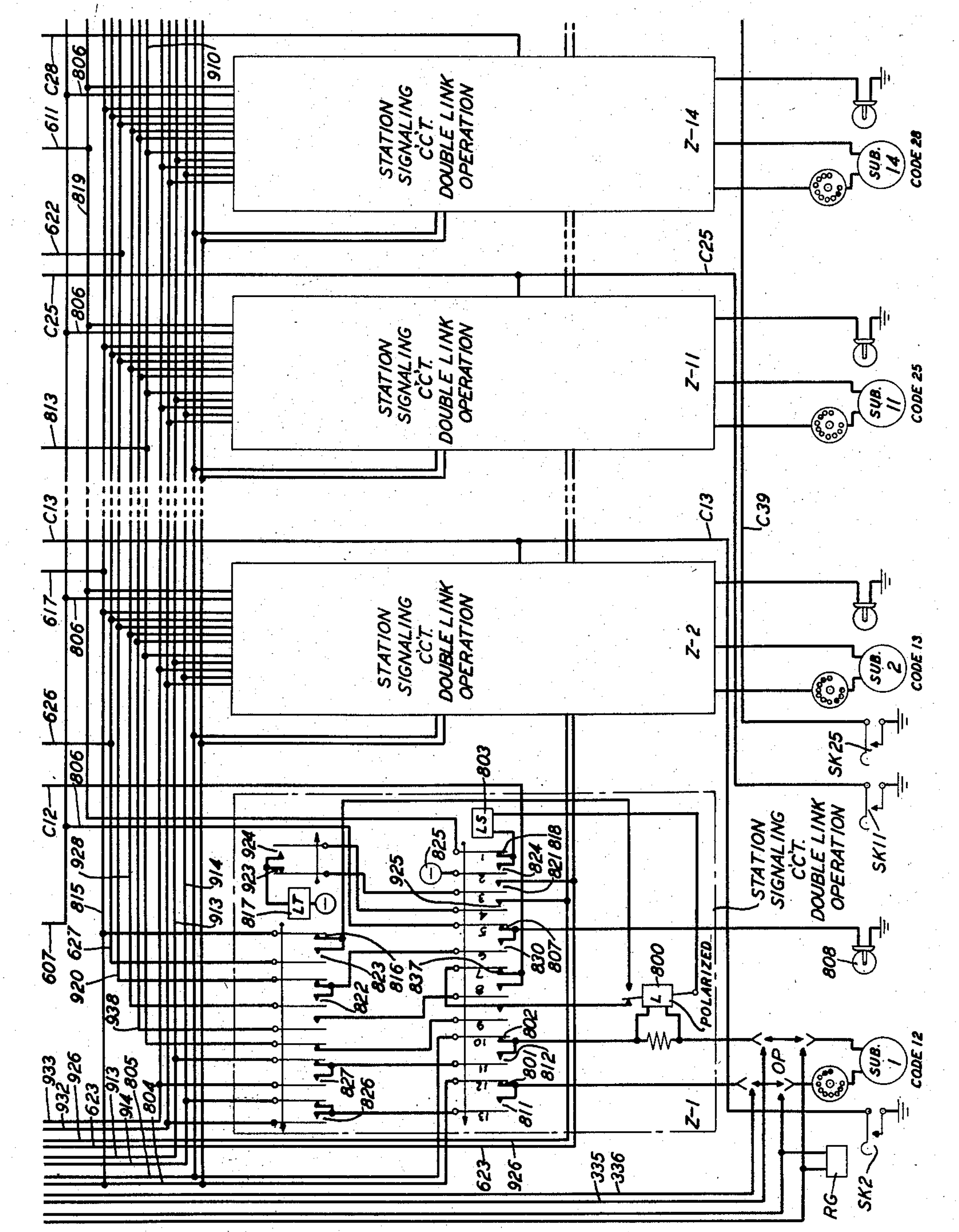
Figure 9:
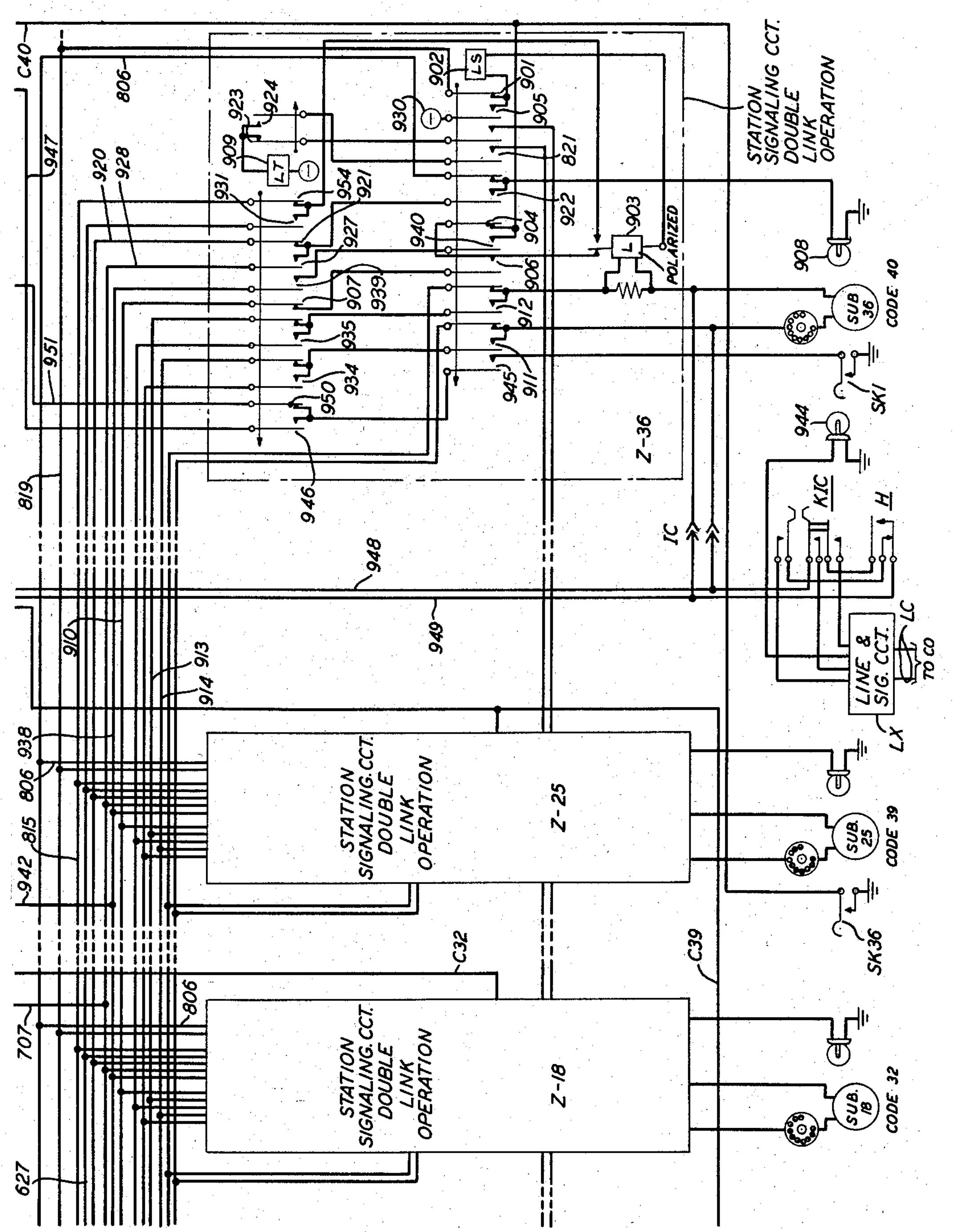

Fig. 7 shows the busy signal and camp-on control circuit and also the incoming conference circuit, the latter being included in the broken line block designated ICC; and Figs. 8 and 9 show seven of a possible number of 36 stations comprising the intercommunicating system of this invention, each with its own associated station signaling circuit, two of which are shown in detail and the others in block form. Fig. 9 also illustrates, schematically, a line and signaling circuit LX associated with a central office or private branch exchange line or trunk circuit which is identified at the station 36 by a lamp signal 944 and which may be extended to other stations of the system by way of the incoming conference circuit ICC (Fig. 7) under control of the party at station 36.

Preparatory to describing, in detail, the operation of the intercommunicating system disclosed in Figs. 3 to 9, inclusive, brief reference will be made to the schematic diagram shown in Fig. 1. In this figure, several local stations designated 1, 2, 11, 14, 18, 25, and 36 are shown, each of which is indicated as having access to the common selector switch circuit S (Fig. 3) by means of which selective signaling of the other stations of the system is effected under control of a dial at each station. Certain of these stations, such as stations 1, 2, 25 and 36, for example, are shown equipped with signal keys by means of which other stations may be signaled, selectively, without recourse to the dial. It is understood that in the disclosed system any station may be equipped with one or more keys, station 2 being shown in the drawing as being provided with two keys, one, SK11, for use in selectively signaling station 11 and the other, SK25, for use in signaling station 25. The key SK1 shown at station 36 is used to complete an incoming conference call as will be described in detail hereinafter.

Optional wiring OP shown associated with the circuitry at station 1 may be provided in which case, as will be described in detail hereinafter, station 1 would have the status of an off-premise station and as such would be remotely located with respect to the local stations of the intercommunicating system.

Each station requires its own station signaling circuit Z–1, Z–2, etc., which, on incoming calls, is reached by way of the selector circuit S and one of the three transfer circuits TC1, TC2, TC3, over individual leads designated by the letter C.

Certain of the terminals of the selector switch A (Fig. 3) associated with the selector circuit S, which are not assigned to individual stations, may be allocated to groups of stations which are simultaneously signaled by way of a preset conference circuit (Fig. 4) for conference purposes. Such groups may be reached selectively from any of the stations by the dialing of a conference code or by the operation of a signaling key provided for such purpose.

Figures 1, 2:
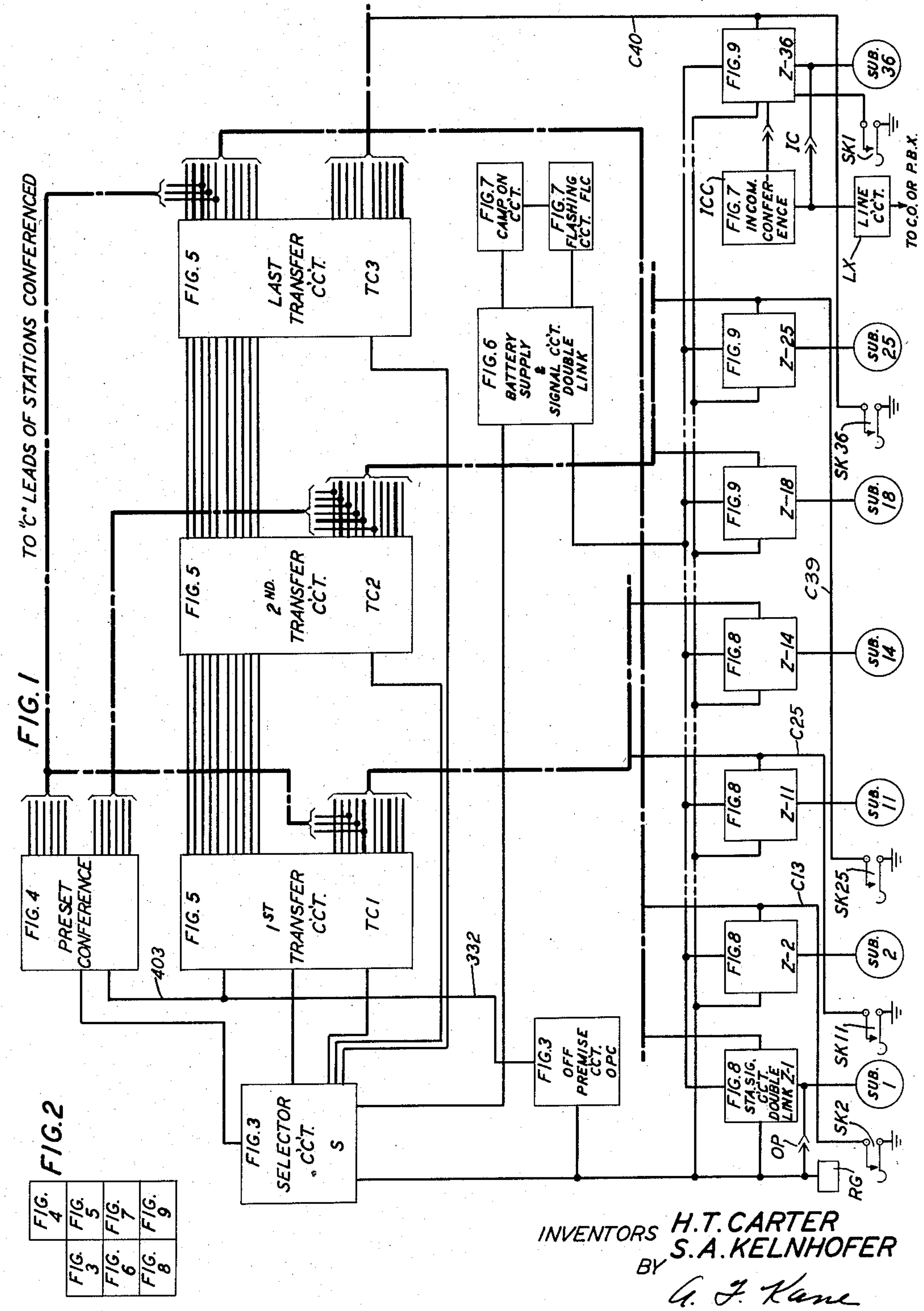
Fig. 1 is a block diagram showing schematically the various circuit components which cooperate in effecting an intercommunicating system involving the features of the invention.
Fig. 2 is a block diagram illustrating the manner in which Figs. 3 to 9 inclusive are combined to effect a complete operative embodiment of the invention.
Figure 3:
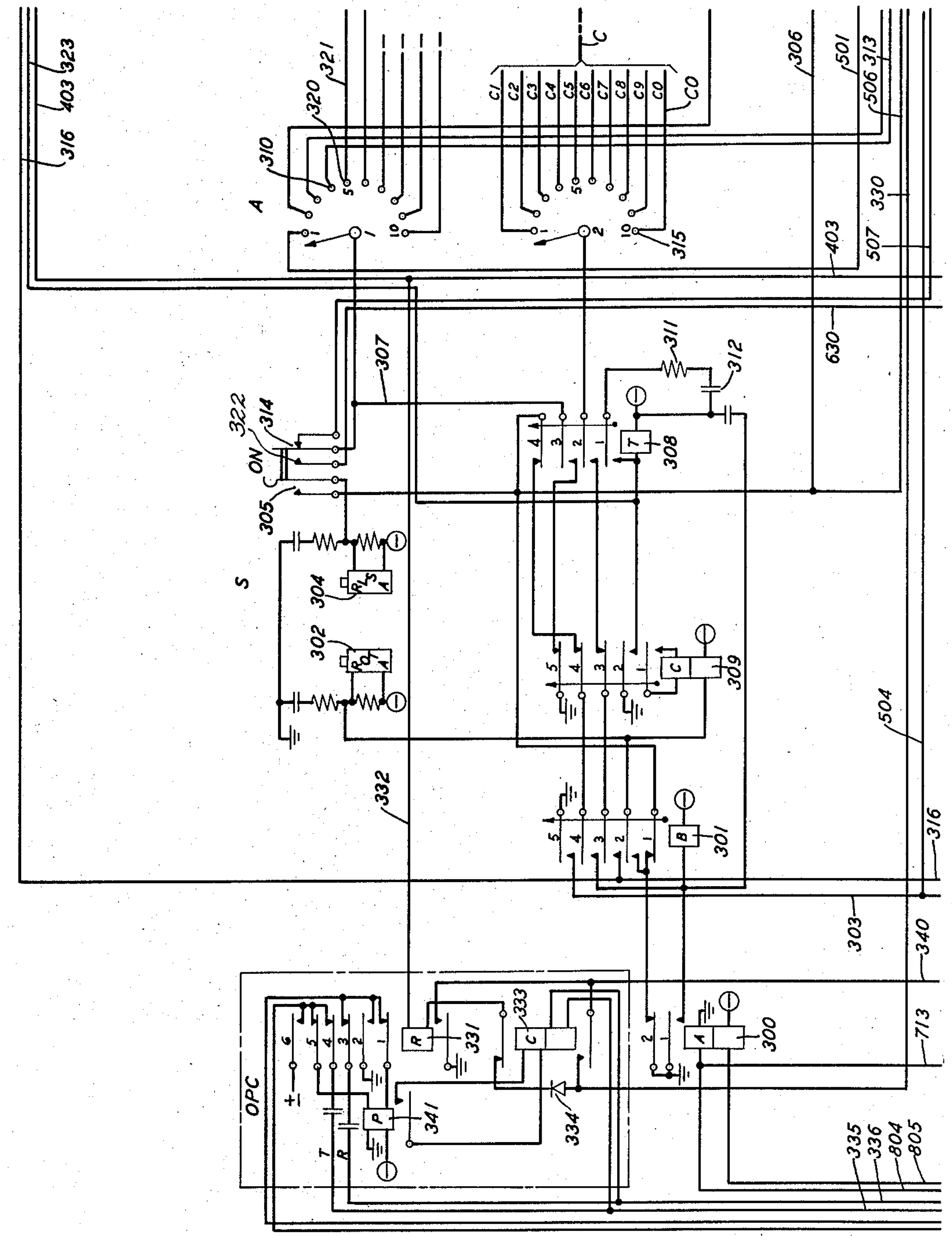
Fig. 3 is a circuit diagram of a selector switch A which constitutes one of the common components of the intercommunicating system of this invention and through which dial selective signaling of the stations of the system is accomplished. This figure includes also the off-premise circuit shown in the broken line enclosure identified by the designation OPC.

Further flexibilities and features of the intercommunicating system indicated schematically in Fig. 1, will appear from the detailed description of Figs. 3 to 9, inclusive, to be made presently. While the involved system is capable of functioning on a selector-only arrangement; on a single talking link arrangement which requires one or more transfer circuits (Fig. 5) if the code capacity of the system is to exceed nine codes; or on a double talking link arrangement, applicants have elected to confine the description to the double talking link arrangement only, since this arrangement includes all the features and operating procedures involved in the other two arrangements. The two talking links are designated L1 and L2 in Fig. 6, the link L1 constituting the primary link and the link L2 constituting the secondary link.

The operation of the intercommunicating system of this invention will now be described in detail.

*Line seizure*

When a party at a station, such as on premise station 1 for example (Fig. 8), removes the telephone handset from its support to initiate a call, the associated line relay 800, which is polarized, operates but performs no useful function at this time. Suffice it to say that the operating circuit for relay 800 includes the switchhook contacts (not shown) at station 1, normal contacts 801 and 802 of relay 803, conductors 804 and 805, and the windings of relay 300 of the selector circuit S, Fig. 3.

Relay 300 in the selector circuit S operates and completes an obvious energizing circuit for slow-to-release relay 301. Relay 301 operates and, at its No. 2 armature, prepares the circuit for rotary magnet 302 preparatory to stepping the selector switch A. At its No. 5 armature, relay 301 applies ground to conductor 303 which causes relay 600 (Fig. 6) to operate under control of relay 601 in a circuit which includes negative battery, the winding of relay 600, conductor 602, back contact and No. 1 armature of relay 601, resistor 603, conductors 604 and 303, front contact and No. 5 armature of relay 301, and ground. Relay 600, operated, lights the busy lamps steadily at all stations, applies a ground start signal to the associated flashing circuit FLC (Fig. 7) and applies a ground signal to an associated time-out control circuit, if provided.

The circuit for each station busy lamp can be traced from negative battery at 605, conductor 606, the No. 10 armature and front contact of relay 600, conductor 607, conductor 806, contacts 807 of relay 803, filament of lamp 808, to ground. For purposes of clarity, each of the conductors, such as conductor 806 at station 1, associated with the remaining stations is designated also by the numeral 806, it being apparent that all such conductors are multipled to the conductor 607. The lamps, such as 808 at station 1 and 908 at station 36, at all stations are now lighted steadily.

The ground start signal to the flashing circuit FLC is applied to conductor 608 by way of the No. 6 armature and front contact of relay 600.

*Release on preliminary pulse*

When the digit 1 is dialed initially at a calling station, or is registered in the selector due to handset fumbling, a ground signal is applied to the selector release magnet 304 under control of the bank No. 1 of selector switch A to cause the selector to return to normal. The release magnet energizing circuit may be traced from negative battery through the winding of release magnet 304, contacts 305 of off-normal switch ON, conductor 306, No. 1 armature and back contact of relay 500 of the first transfer circuit TC1, similar armatures and back contacts of corresponding relays of transfer circuits TC2 and TC3, conductor 501, No. 1 terminal and brush of the bank No. 1 of selector switch A, conductor 307, No. 3 armature and front contact of relay 308, back contact and No. 5 armature of relay 309, to ground. The selector A returns to normal under control of the release magnet 304 and the selector circuit S is ready to receive the first pulse train.

*Station selection*

Relays 300, 301, and 600 have previously been operated, as described.

Figure 5:
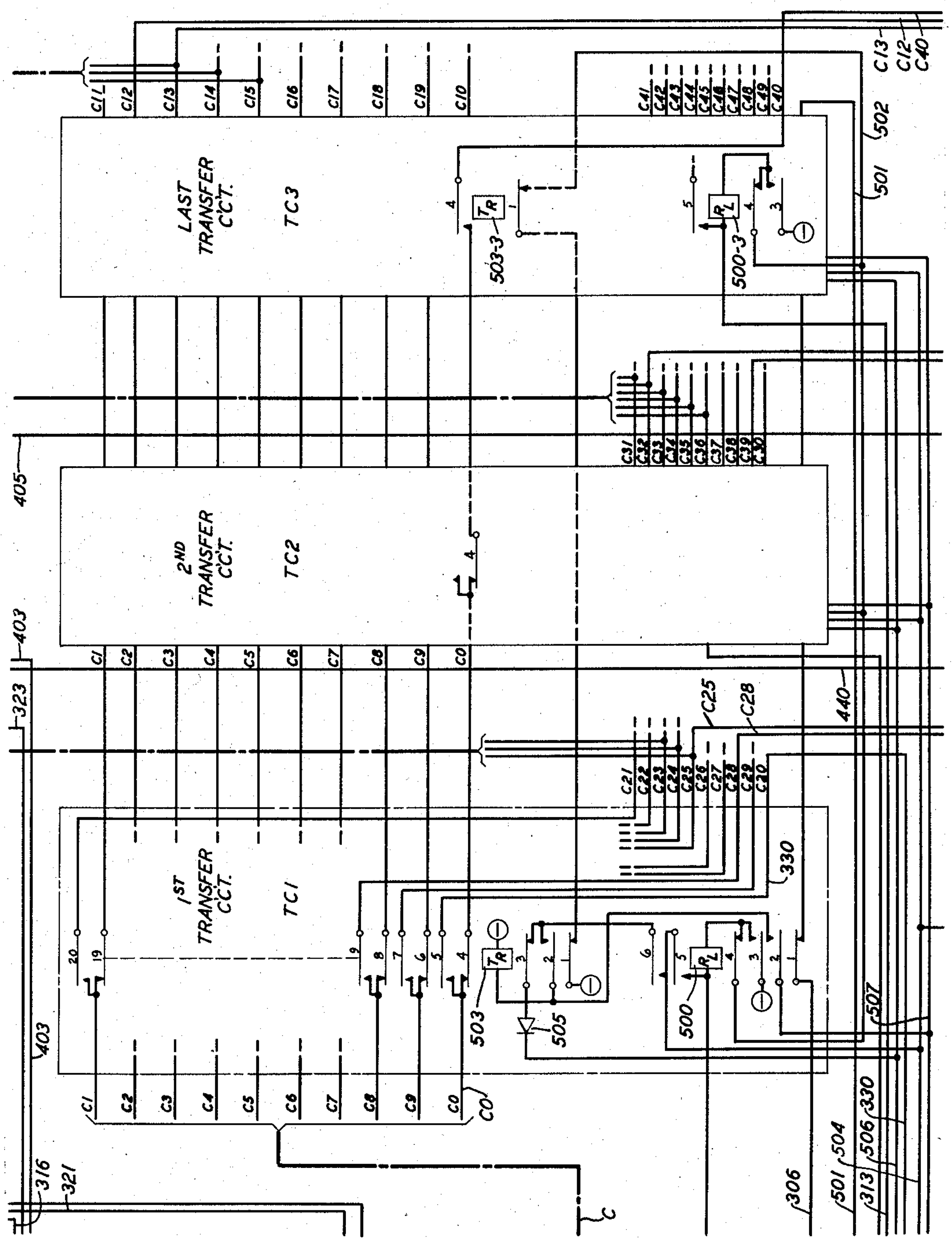
Fig. 5 is a circuit diagram of three transfer circuits, the first of which is shown in substantially complete detail and the second and third of which are shown in block form with minor elaboration of the third.
Figure 6:
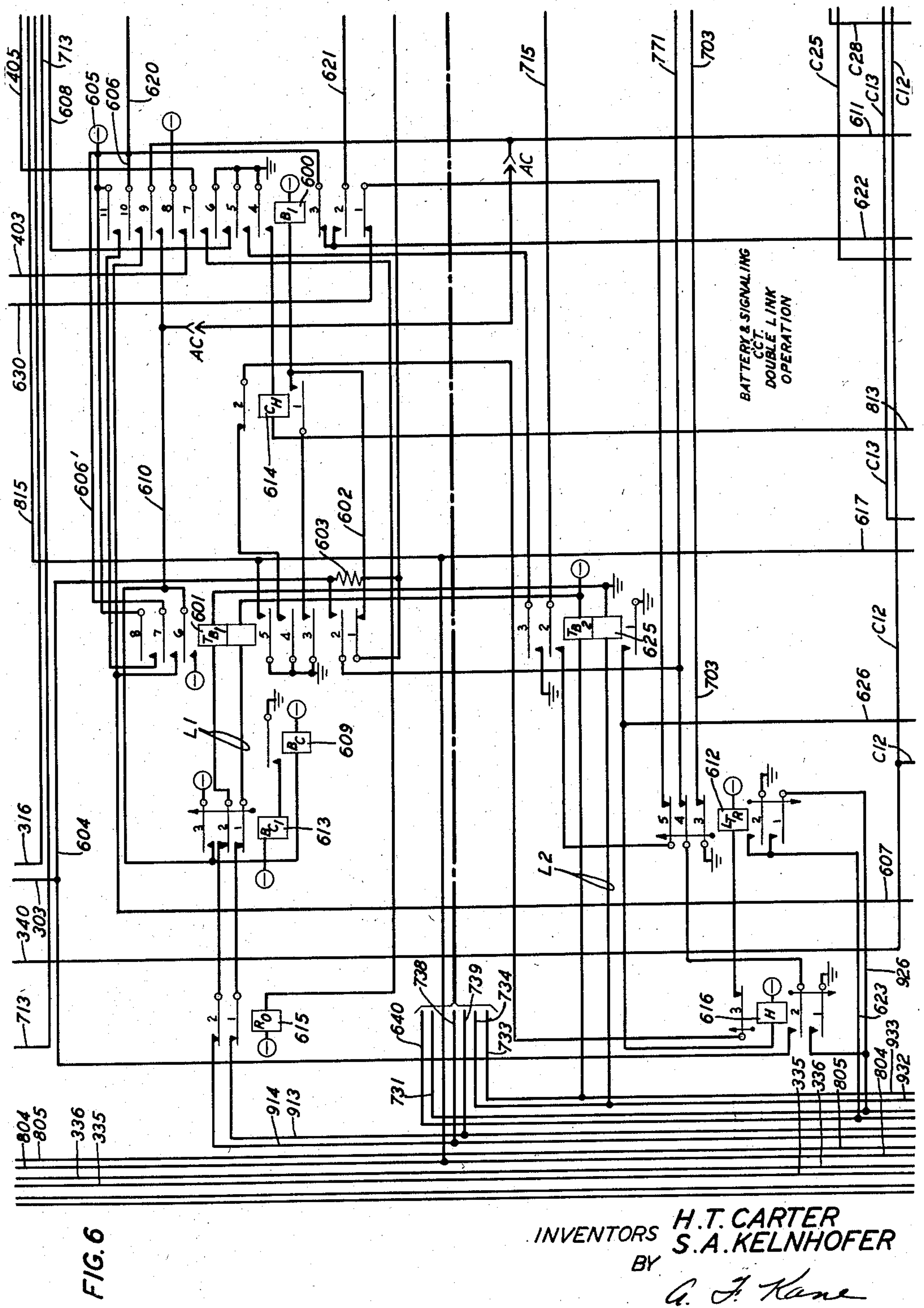
Fig. 6 is a circuit diagram of the battery supply and signaling circuit used in the double link operation of the involved intercommunicating system.

In systems involving a maximum of nine stations, the stations are selected by dialing a single digit (2 through 0) corresponding to the desired station. Intercommunicating systems of more than nine codes involving the use of transfer circuits such as are indicated in Fig. 5, there being one such circuit required for each nine additional codes until the arbitrarily chosen maximum system capacity of thirty-six codes has been obtained. Stations designated by two-digit codes are selected by first dialing the tens digit transfer code, and then by dialing the units digit. Single digit numbers may not be used as station codes when they are used for transfer codes.

In the present description, the calling party at station 1 is assumed to desire connection with the party at station 36, the station designation for which is 4–0, the digit 4 being the transfer code and the digit 0 being the station code.

When the transfer code 4 is dialed by the party at station 1, relay 300 releases and reoperates in unison with the dial pulses. Relay 301 is slow to release and remains operated during dialing. As relay 300 pulses, ground potential is connected, under control of relay 301, to the winding of rotary magnet 302. The operating circuit for magnet 302 includes the No. 2 armature and front contact of relay 301. Magnet 302 causes the selector switch A to step in unison with the dial pulses and, in accordance with the dialing of the digit 4, advances the selector switch to its fourth position in which the brush of bank No. 1 is set on terminal 310.

Slow-to-release relay 309 operates on the first release of relay 300 over an obvious circuit which includes its lower winding. Relay 309 remains operated during the pulse train. Relay 308 operates in an obvious circuit following the operation of relay 309 and, at its No. 1 armature and front contact, connects the network consisting of resistor 311 and capacitor 312 across its winding to allow the network to charge during pulsing.

At the end of the pulse train, relay 309 releases and relays 300 and 301 remain operated. The release of relay 309 connects a ground signal to conductor 313 to cause relay 500–3 in transfer circuit TC3 to operate in a circuit which includes the now grounded conductor 313, the winding of relay 500–3 and its No. 4 armature and back contact, conductor 502, the back contacts and No. 1 armatures of each relay 503 of the transfer circuits TC3, TC2 and TC1, and negative battery.

It will be observed at this time that except for the partial showing of relay 500–3, the transfer circuits TC3 and TC2 are shown in block form and that any circuit tracing which involves the omitted circuitry is applied to the corresponding circuitry shown in detail in the transfer circuit TC1.

Relay 500–3 of transfer circuit TC3 which corresponds to relay 500 of transfer circuit TC1, locks operated in a circuit which includes its winding, front contact and No. 5 armature, conductors 504 and 303, front contact and No. 5 armature of relay 301 and ground. At its No. 6 armature and front contact, relay 500–3 extends the ground on conductor 504 over the back contact and No. 3 armature of the corresponding relay 503, and rectifier 505, conductor 506, contacts 305 of off-normal switch ON, to negative battery, by way of the winding of release magnet 304. At its No. 2 armature and front contact, relay 500–3 completes a circuit for the transfer relay 503–3 extending from negative battery, over the winding of relay 503–3, front contact and No. 2 armature of relay 500–3, conductor 507, contacts 314 of off-normal switch ON, conductor 307, No. 3 armature and front contact of relay 308, back contact and No. 5 armature of relay 309 to ground. Release of the selector under the action of release magnet 304 and the consequent closure of off-normal switch contacts 314 cause relay 503–3 to operate in the circuit just traced.

Relay 503–3, operated, locks by way of its No. 2 armature and front contact under control of relay 500–3 and relay 301. At its armatures Nos. 4 through 20, relay 500–3 transfers the C leads connected to No. 2 bank of selector switch terminals from single digit code stations to a group of two-digit code stations represented by the conductors C40 to C49 shown at the lower right of Fig. 5. At its No. 3 armature, relay 503–3 opens the circuit to release magnet 304, and at its No. 1 armature, it opens the operate path to other relays, such as relays 500, 500–3 (not shown).

The units digit code, which is 0 in the immediate situation, is now dialed and upon completion of the second pulse train, a ground signal is connected to the station signal circuit Z–36 (Fig. 9) of the called station 36 under control of the selected lead C40. It will be understood that in response to the dialing of the units digit 0, the brush of No. 2 terminal bank of selector switch A is set on the bank terminal 315 which is associated with lead C0, which, in turn, is now connected to lead C40 by way of the No. 4 armature contacts of relays 503 and 503–2 (not shown) and the front contact of relay 503–3. The following circuit now exists: from negative battery, over the winding of relay 609, conductor 610, front contact and No. 9 armature of relay 600, conductors 611 and 819, armature contacts 901 and winding of relay 902, left armature contacts of relay 903, armature contacts 904 of relay 902, conductor C40, No. 4 armature and front contacts of relay 503–3, No. 4 armatures and back contacts of relays 503–2 (not shown) and relay 503, conductor C0, terminal 315 of selector bank No. 2 and its associated brush, No. 2 armature and front contact of relay 308, back contact and No. 3 armature of relay 309, No. 3 armature and front contact of relay 301, conductor 316, back contact and No. 6 armature of relay 702, conductor 703, back contact and No. 3 armature of relay 612 to ground. Relay 609 operates in this circuit and, in turn, operates relay 613 in an obvious circuit. Relay 613, operated, connects negative battery by way of its No. 3 armature and front contact, to conductor 610 thereby shunting down relay 609 and allowing relay 902 at the called station 36 to operate. Relays 609 and 613 then return to normal. The relays 609 and 613 are provided to open an operate path to relay 601 before relay 902 operates. If this were not done, the operate path for relay 601 would exist under control of the continuity contacts 811 and 812 of relay 803 and the calling station's telephone set.

Relay 902, operated, opens the operate path for relay 609 at contacts 901 and 904 and locks in a circuit which includes negative battery, its own armature contacts 905 and winding, armature of relay 903, contacts 906 of relay 902, contacts 907 of relay 909, conductor 910, conductor 813, winding of relay 614, front contact and No. 4 armature of relay 600 and ground. At contacts 911 and 912, relay 902 connects the telephone set at the called station 36 to the conductors 913 and 914 and thence over the Nos. 1 and 2 armature contacts of relays 615 and 613, to negative battery and ground by way of the windings of battery feed relay 601.

When the dialed station 36 is selected, the steady condition of the lighted lamp 908 is changed to a flashing condition under control of the flashing circuit FLC shown in Fig. 7. When relay 600 operated, as described, it connected ground by way of its No. 6 armature and front contact to conductor 608 to cause the flashing circuit FLC, consisting of relays 705 and 706, to start operating. Relay 706 operates in a circuit which includes the ground on conductor 608, the armature and back contact of relay 705, the winding of relay 706 and negative battery. When relay 706 operates, it completes an obvious operating circuit for relay 705. Relay 705 thereupon operates and opens the operating circuit of relay 706, which relay releases and opens the operating circuit for relay 705. Relay 705 thereupon releases and reestablishes the operating circuit for relay 706. This cycle of operations continues as long as ground is applied to the start conductor 608 by the operation of relay 600. Each time relay 706 operates, it connects the negative battery 605 on conductor 620 to conductor 621, thence over the No. 2 armature and front contact of relay 600, conductor 622, conductor 920, contacts 921 of relay 909, contacts 922 of relay 902, filament of lamp 908 at the called station 36 to ground. Lamp 908 operates in this circuit and flashes as a call signal.

*Talking—Secondary link free*

Relays 300, 301, 600, relay 803 at the calling station 1 and relay 902 at the called station 36 are now operated, as described.

In answer to the flashing lamp 903, the party at station 36 removes the telephone handset to connect the associated telephone circuit to the tip and ring conductors 913 and 914, whereupon the battery supply relay 601 operates over the closed loop at the called station. Relay 601, operated, opens the operate path to relay 600. At its No. 6 armature, relay 601 connects negative battery to conductor 610 to prevent any further operation of relays 609 and 613. At its No. 4 armature, relay 601 connects ground to one side of relay 612 by way of the upper armatures and back contacts of relays 615 and 616. At its No. 5 armature and front contact, relay 601 connects ground to conductor 617 whereupon relay 803 at calling station 1 operates over a circuit which includes the ground on conductor 617, conductor 815, contacts 816 of relay 817, right contact and armature of relay 800 (operated in series with relay 300), winding of relay 803 and its contacts 818, conductor 819, conductor 611, No. 9 armature and front contact of relay 600, conductor 610, to negative battery by way of the No. 6 armature and front contact of relay 601. Stations 1 and 36 are now connected to the battery supply relay 601 over link L1 and the bridge across relay 300 is removed by the opening of contacts 801 and 802 of relay 803. The relays of the selector circuit S now restore to normal.

It will be noted that any station other than the called station 36 may respond to the calling signal since all lamp signals such as 808 and 908 are connected in parallel to the conductor 607. In this case talking battery to the responding station is furnished by way of the windings of relay 300. The relay of the responding stations, such as relay 800, 903, etc., will operate but perform no useful function at this time.

After the operation of the relay 601, relay 612 operates in the circuit previously described. At its No. 2 armature and front contact, relay 612 connects ground to conductor 623 and thence to the armature contacts 821 of all station relays such as relays 803 and 902, and through the windings of the corresponding station relays such as relays 817 and 909 by way of their associated armature contacts 923. Thus, all station relays such as relays 817 and 909 that have their associated relays such as relays 803 and 902 operated, will also operate.

Relay 817 at station 1, operated, locks by way of its contacts 924, over contacts 925 of relay 803, conductor 926, the No. 1 armature and front contact of relay 612 to ground. The operated relay 909 at the called station 36 locks in a similar circuit under control of relays 902 and 612. At contacts 822 of relay 817 and at contacts 927 of relay 909, the control of the visual signals 808 and 908 at stations 1 and 36, respectively, is transferred to conductor 707 by way of conductor 928. The holding circuit for each of relays 803 and 902 at stations 1 and 36, respectively, is now transferred from relay 601 to ground at the No. 1 armature of relay 625 which is connected to negative battery 825 by way of conductor 626, conductor 627, contacts 823 of relay 817, right contact and armature of relay 800, winding of relay 803 and contacts 824 thereof, and also to negative battery 930 by way of conductor 626, conductor 627, contacts 931 of relay 909, right contact and armature of relay 903, winding of relay 902 and contacts 905 thereof. At contacts 826 and 827, relay 817 connects the telephone line circuit of station 1 to conductors 932 and 933 which supply battery to the line by way of link L2 and the windings of relay 625. Similarly, relay 909, at contacts 934 and 935, connects the telephone line circuit of station 36 to the conductors 932 and 933 and thence to battery and ground through the windings of relay 625 associated with the secondary link L2. The station line circuits simultaneously are disconnected from the primary line circuit L1 which supplies battery and ground to the stations by way of the windings of relay 601. Thus it is that when the secondary link L2 is idle, the connection between the calling and called stations is first set-up over the primary link L1 and then transferred to the secondary link L2.

Relay 625 operates over the station loop circuits. Relays 803 and 902 are held operated to ground at the No. 1 armature contacts of relay 625, which ground also causes relay 616 to operate in an obvious circuit. Relay 616, operated, applies ground to conductor 926 to hold relays 817 and 909 operated for the length of the call. Relay 616 also releases relay 612, thus removing the original ground from conductor 926. These means enable stations, such as stations 1 and 36, which on pickup are first connected to the primary link L1 and relay 601, to be immediately connected to the secondary link L2 and relay 625. Conversation may now take place with talking supply being furnished from the common battery feed relay 625.

*Talking—Secondary link busy*

The subscriber at called station 36 in answer to the call signal, picks up and connects the associated telephone circuit to the tip and ring conductors 913 and 914, as described, to cause the operation of battery feed relay 601 associated with the primary link L1. Relay 601 operates and performs the functions ascribed to it in the preceding description. If the secondary link L2 is busy, relay 625 and therefore, relay 616 will be operated. Hence the transfer from link L1 to trunk L2 as described above, cannot take place and no transfer will be possible until relay 616 releases. Talking battery will be supplied to those stations such as stations 1 and 36 by way of link L1 and the windings of relay 601 and a conversation, which is independent of the one being carried on over the secondary link, may now take place by way of the primary link.

*Link transfer during the call*

Should the stations such as stations 1 and 36 which are connected to the secondary link L2 disconnect, while there are stations connected to the primary link L1, those stations on the primary link will automatically be transferred to the secondary link connection. The system will then be free to take another call. After all stations, such as stations 1 and 36, on the secondary link L2 disconnect, relay 625 will release causing the release of relay 616. Relay 616, released, completes the operate path for relay 612 which relay, in operating, places the ground transfer signal on conductor 623 causing such stations that are connected to the primary link to be transferred to the secondary link, as previously described.

*Disconnection—Primary link*

As each station disconnects, the associated relays such as relays 800 and 803 of station 1 and relays 903 and 902 of station 36 are released due to the opening of the station loop circuits at the receiver switchhook contacts. The last station to release opens the operate path for relay 601 causing the release of this relay. This system immediately becomes available for another call.

*Disconnection—Secondary link*

As each station disconnects, the associated relays such as relays 800, 803 and 817 are released. The last station to release opens the operate path to relay 625 which relay releases causing the release of relay 616. If the primary link L1 is busy, the transfer operation will take place before the system will again be available for another call.

*Busy*

In the preceding description it is indicated that the selection of a station, such as station 36, is effected by the application of ground to an associated C lead, such as the lead C40. Should the selected station be busy on the secondary link, the ground at the C lead, such as lead C40 in the case of station 36, will be connected to the conductor 938 by way of contacts 939 of relay 909 and contacts 940 of relay 902, and thence over conductor 942 to the winding of relay 702 and negative battery. Relay 702 operates in this circuit and locks operated in a circuit which includes negative battery, the winding of relay 702 and its front contact and No. 1 armature, back contact and No. 2 armature of relay 710, conductor 771, back contact and No. 4 armature of relay 612, No. 2 armature and front contact of relay 616, conductors 604 and 303, front contact and No. 5 armature of relay 301, and ground. At its No. 4 armature and front contact, relay 702 connects start ground by way of conductor 717, the back contact and No. 4 armature relay 710 and the armature contacts of relay 705, to the winding of relay 706 to initiate the operation of the flashing circuit FLC which functions in the matter previously described. At the No. 3 armature and front contact of relay 702, ground is connected, by way of the No. 3 armature contacts of relay 710, to the winding of vibrator 711 and thence to negative battery. At its No. 8 armature and front contact, relay 702 connects the conductor 713 to the flashing circuit for a purpose to be described presently.

The vibrator 711 operates in the circuit controlled by relay 702 just described, and a tone signal resulting from the condenser discharge across its operating winding is connected to the conductor 713 under control of the flashing circuit relays 706 and 705. This tone signal is transmitted over conductor 713 which is connected to the tip conductor 804 associated with the upper winding of relay 300, and is received in the telephone receiver at the calling station such as station 1, indicating that the called station, such as station 36, is busy.

*Signal key selection*

It will be observed that certain of the stations of Figs. 8 and 9 are provided with a signal key SK. In the exemplary disclosure, stations 1, 2, and 25 are so equipped. Such keys may be furnished on a one-per-station-per-called-station basis. In the illustrated arrangement it will be noted that key SK2 at station 1, when actuated, applies ground to the conductor C13 which is individual to the station signaling circuit Z–2 associated with station 2, so that the latter station may be signaled from the station 1 merely by the actuaton of the key SK2 thereat. Similarly, key SK25 at substation 2 applies ground to conductor C39 which is individual to the station signal circuit Z–25 associated with substation 25, so that the latter station may be signaled by the party at station 2 merely by the actuation of key SK25 at the latter station. In like manner, the actuation of key SK36 at station 25 which grounds conductor C40 results in the operation of relay 902 at station 36 to effect the signaling of the latter station. It is not deemed necessary to describe in detail the actual signaling and other circuit functions resulting from the actuation of any of the SK keys since such details have already been covered in the description directed to the dial selection of station 36 by the party at station 1 which resulted in the application of signal ground to conductor C40.

It is to be understood that any and all stations may be equipped with a signal key SK and circuit connections made in such a manner as to render each key operable to effect the signaling of a different other station. It is apparent also that the signaling keys at more than one station may be assigned to effect the selection of the same called station. It also comes within the scope of this phase of the disclosure to provide one or more stations with a plurality of signal keys.

*Conference connections—Preset conference*

Figure 4:
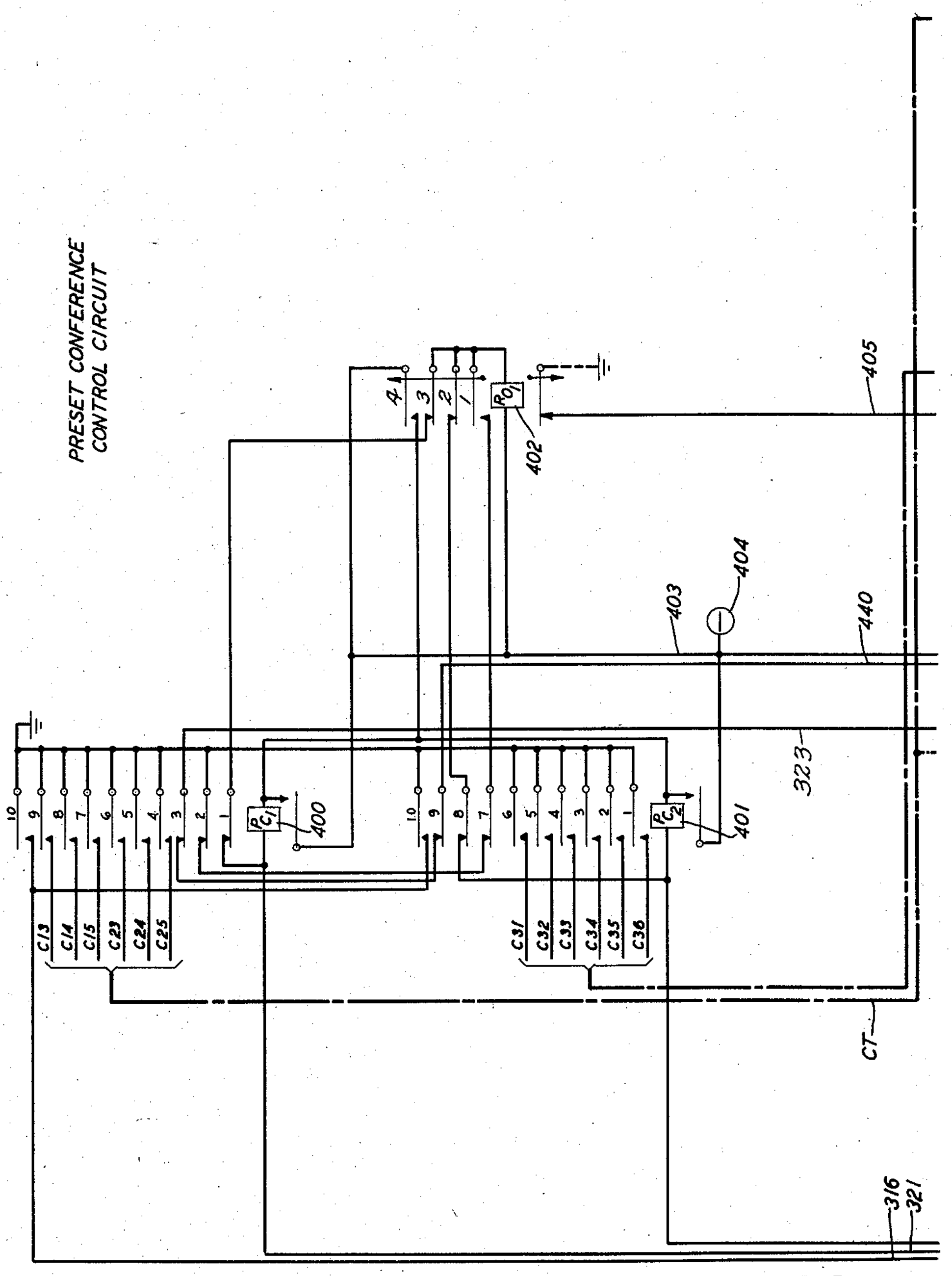
Fig. 4 is a schematic diagram of a preset conference control circuit involved in the intercommunicating system of this invention.

A preset conference arrangement enables an intercommunicating station to select a group of stations through means of a dialed code or by the operation of a signal key SK as previously indicated. Fig. 4 discloses a preset conference control circuit which may be used to provide a preset conference plan involving a maximum of six stations. Any number of preset conference arrangements may be included, limited only by the number of stations to be selected on an individual basis. Any one station may also be included in different preset conference groups.

When the code reserved for calling a conference is dialed, the selector circuit S (Fig. 3) functions in the manner described hereinbefore in connection with the dialing of a station-identifying code. For purposes of description, it will be assumed that the digit 5 is assigned to one of the preset conference groups and that this digit is dialed at a station such as station 1. When the selector switch A, in response to the dialing of this code, functions to set the wiper of terminal bank No. 1 on the selected terminal 320, and relay 309 releases, as previously described, ground at the No. 5 armature contacts of relay 309 is extended over conductor 307, the wiper of terminal bank No. 1 and its terminal 320, conductor 321, the No. 1 armature contacts of relay 400, the No. 3 armature contacts and winding of relay 402, conductor 403, to negative battery at 404. Relay 402 operates in this circuit.

At its No. 4 armature and front contact, relay 402 connects negative battery at 404 to the winding of relay 400, thence over conductor 321 to ground as previously described. At its lower armature and back contact, relay 402 opens the operating path to relay 615 which includes conductor 405 and the No. 7 armature and front contact of relay 600, thereby delaying the operation of the audible signaling (if provided) until the line signaling relays of the called stations, such as line signaling relays 803, 902, etc., have operated. At its No. 1 armature and front contact, relay 402 locks operated under control of relays 400 and 401.

Relay 400 operates and connects negative battery at 404 to its winding by way of its lower armature and front contact and thus locks operated. At its No. 2 armature and front contact, relay 400 opens the locking circuit to relay 402. At its Nos. 4 to 9 armatures, relay 400 connects ground to C conductors C13, C14, C15, C23, C24, and C25 which, as is indicated by the broken line CT, are connected to correspondingly designated conductors extending to the individual station signaling circuits whereby the corresponding line relays, such as relay 803, operate. The conductor C13, for example, extends from the No. 9 armature contacts of relay 400 over the cable CT and thence to the station signaling circuit Z–2, and corresponds to and serves in the same capacity as does conductor C12 with respect to the station signaling circuit Z–1. Thus, the relays, such as relay 803 of station 1 and relay 902 of station 36, of all stations to which the C conductors C13, C14, C15, C23, C24, and C25 are individually allocated, operate in response to the dialing of the conference code at the calling station.

Relay 308 of the selector circuit S releases at the end of a nominal 1½-second interval, removing ground from the conductor 307 and therefore from the conductor 321. This removal of ground causes relay 400 to release thus opening the audible signaling circuit (if provided) to the called stations.

The line signaling relays, similar to relay 803, associated with the called stations corresponding to conductors C13, C14, C15, C23, C24, and C25 lock operated under control of relay 600 in a circuit which includes the winding of relay 614, as previously described. Relay 614 operates at this time because there are at least two relays being held over the common lock-up path for the line relays, such as relay 803.

Relay 614, operated, opens the operate path for relay 612 preventing the link transfer operation (previously described) until all signaled stations respond to the conference signal. After the first called station answers, an obvious hold path is provided for relay 600 under control of relays 601 and 614. As each called station answers, the lock-up path for the associated line signaling relay, such as relays 803, 902, etc., is transferred from relay 600 to relay 601. When the last signaled station answers, the operate path for relay 614 will be opened and the relay will release. In this way the link transfer operation is controlled and a flashing lamp signal will be manifested at all called stations and at the calling station after the first conference station answers and until all stations have answered. This flashing lamp signal is used to indicate just when the called conference connection is completed.

Should some of the signaled stations be busy on the secondary link, the calling party will receive the busy signal operated as described previously under the heading "Busy" until the first station answers. As soon as all stations which are not busy have answered, the flashing lamp signal will cease.

The other talking, transfer and disconnect operations are the same as previously described under the headings "Talking" and "Disconnection."

*Selected conference*

A selected conference may be called through the operation of a number of signaling keys furnished on a one-per-station-per-called-station basis. For example, station 2 is shown equipped with two signaling keys SK11 and SK25. The key SK11 functions when operated to connect ground to conductor C25 while the signal key SK25 functions, when operated, to connect ground to the conductor C39. Obviously, the simultaneous operation of these two keys at station 2 results in the completion of a conference connection involving the call-originating station 2 and the called stations 11 and 25. The circuit operations resulting from the actuation of such signal keys are the same as have been described heretofore under the headings "Signal key selection" and "Conference connections."

*Camp-on*

In accordance with the camp-on feature of the invention, a station may pick up, dial a code to select another station and then reserve or camp-on the system until the called station is free to answer, or the system is free to take another call. As soon as the desired station is free or as soon as the system is available to take another call, the previously selected station is automatically signaled without further effort on the part of the party on the calling station.

*Camp-on operation when both talking links are busy*

When both links L1 and L2 are busy, the busy lamps are lighted at all stations; the communicating stations have the relays of their associated station signaling circuits, such as relays 803 and 817 of signaling circuit Z–1, relays 902 and 909 of signal circuit Z–36 operated, and the battery feed relay 601 is operated preventing further operation of relay 600. The party at a station wishing to camp-on the system picks up the telephone from its support and is connected to the selector circuit S under control of its line signaling relay, such as relay 803, in a manner previously described. The code corresponding to the desired station is dialed and the selector switch A operates accordingly, as hereinbefore described. At the completion of the pulse train, a ground signal is connected to the winding of relay 710 which relay thereupon operates in a circuit which includes negative battery, the winding of relay 710, back contact and No. 2 armature of relay 702, conductor 715, No. 2 armature and front contact of relay 625, No. 5 armature and back contact of relay 612, No. 1 armature and back contact of relay 600, conductor 630, contacts 322 of off-normal switch On, conductor 307, No. 3 armature and front contact of relay 308, back contact and No. 5 armature of relay 309 and ground. The ground is also connected to the selected C lead of the terminal bank No. 2 of selector switch A by way of the No. 3 armature and back contact of relay 612, conductor 703, the No. 6 armature and back contact of relay 702, conductor 316, front contact and No. 3 armature of relay 301, No. 3 armature and back contact of relay 309, front contact and No. 2 armature of relay 308 and the selector brush associated with terminal bank No. 2 of the selector switch S.

Relay 710, operated, connects the winding of relay 702 to conductor 715 to effect the operation of relay 702, which opens the various control paths which are used, as described, in the process of camp-on and opens the operating circuit for relay 710. Relay 710 is slow to release and, when a two-digit code is dialed, will remain operated over an interval required to operate the transfer circuit, thus preventing a camp-on when a transfer code is dialed. Relay 702 locks operated in a circuit which includes negative battery, the winding and front contact and No. 1 armature of relay 702, back contact and No. 2 armature of relay 710, conductor 771, back contact and No. 4 armature of relay 612, No. 2 armature and front contact of relay 616, conductors 604 and 303, front contact and No. 5 armature of relay 301 and ground. It will be noted that conductor 771 is connected to ground at the No. 5 armature contacts of relay 301 also by way of the No. 2 armature and front contact of relay 601 and conductors 604 and 303 so that relay 601 also controls the hold circuit for relay 702. At its No. 2 armature, relay 702 opens the operate path for relay 710 as above mentioned. Relay 308 of the selector circuit S is now held operated in a circuit which includes negative battery, the winding of relay 308, conductor 323, No. 3 armature and back contact of relay 400, back contact and No. 9 armature of relay 401, conductor 440, No. 8 armature and back contact of relay 710, front contact and No. 3 armature of relay 702 and ground. Relay 308, operated, prevents the release of the selector and thereby registers the dial code.

At its No. 4 armature and front contact, relay 702 connects starting ground to the flashing circuit FLC by way of conductor 717 and the back contact and No. 4 armature of relay 710. At its No. 3 armature and front contact, relay 702 establishes an operate circuit for vibrator 711 which includes conductor 718 and the back contact and No. 3 armature of relay 710. At its No. 8 armature and front contact, relay 702 connects the conductor 713 to the No. 6 armature contacts of relay 706 by way of the back contact and No. 7 armature of relay 710, and thence to the capacitor-resistor network associated with vibrator 711. The other end of conductor 713 is connected to the upper winding of relay 300 so that a tone signal, resulting from the discharge across the operating winding of the vibrator, is connected to the calling station's telephone set under control of relays 706 and 705 of the flashing circuit by way of conductor 713. This tone signal indicates to the party at the calling station as well as to the parties at any other station which may pick up the telephone thereat, that the system is now camped on. Should the calling station abandon the camp-on, relay 702 will release thus releasing the control of the camped-on station.

The system will be camped on until the stations on the secondary link L2 disconnect and the transfer operation is completed. The release of relay 625 incident to the disconnection to the stations on link L2 and the ensuing transfer operation, previously described, will allow relay 600 to operate and relay 702 to release. The release of relay 702 closes through a ground signal to the line relays of the called station, such as relays 803, 902, etc., under control of the selector circuit S. The circuit for such relay which, for descriptive purposes will be elected to be relay 902, in the event station 36 is the called station, includes ground at the No. 3 armature contacts at relay 612, conductor 703, the No. 6 armature and back contact of relay 702, conductor 316, front contact and No. 3 armature of relay 301, No. 3 armature and back contact of relay 309, front contact and No. 2 armature of relay 308, brush of terminal bank No. 2 of selector switch A, and thence by way of the selected C conductor, such as the conductor C0, over the back contacts of relays 503 and 503–2 (not shown), the front contact and No. 5 armature of relay 503–3, conductor C40, armature contacts 904 of relay 902, left armature contacts of relay 903, winding and armature contacts 901 of relay 902, conductor 700, conductor 611, No. 9 armature and front contact of relay 600, conductor 610, and negative battery at the No. 6 armature contacts of relay 601. The line relay, such as relay 902 at the called station thereupon operates and the called station is signaled in the manner previously described.

*Camp-on operation when the called station is busy on the secondary link*

All stations which, on dialing a station code, happen to encounter a station that is busy on the secondary link L2 may camp on the system until that station is free to answer a call. When a busy station, station 36 for example, is encountered, the ground signal on conductor C40, which, under normal conditions, would operate relay 902, operates relay 702 under the assumed condition of station 36 being busy. This ground on conductor C40 is extended over armature contacts 940 of relay 902. armature contacts 939, of relay 909, conductor 938, conductor 942, the winding of relay 702, to negative battery. Relay 702 locks up and operates the camp-on control and tone signals as described in the preceding section. If the camp on is abandoned, the camp-on control is automatically released. After all stations have disconnected from the secondary link L2, relay 602 releases and initiates the automatic signaling of the selected station in the manner described hereinbefore.

*Urgent call signal*

The urgent call signal is an optional feature which enables a station to signal other stations connected to the secondary link L2 by means of a flashing lamp, asking that the parties at such stations disconnect and allow someone else to use the intercommunicating facilities. The relay 720 together with the optional wiring involving conductors 721 and 722 are employed for this purpose. When a called station is busy or when camp on is employed, the relays 702 and 710 will operate as previously described. Relay 720 then operates under control of the flashing circuit relays 705 and 706 and intermittently connects negative battery to conductor 721 which is connected to the filament of all lamps such as lamp 808 at station 1, by way of armature contacts, such as contacts 822 of relay 817 and armature contacts, such as contacts 830 of relay 803. Thus, when a busy condition on the secondary link L2 is encountered and another station originates a call, the lamp 808 and lamps of all other connected stations will flash and will continue to flash indicating that someone wishes to use the intercommunicating facilities.

*Inward conferencing*

Inward conferencing is an optional feature of the system of this invention which permits directing and incoming central office or private branch exchange line to one of the intercommunicating stations. Optional wiring IC, Fig. 9, is required. By way of example and for descriptive purposes, only station 36 is illustrated as equipped with a suitable key KIC having contacts which terminate a central office or private branch exchange line LC by way of a line and signaling circuit diagrammatically represented by the block LX. The circuit arrangement represented by this block may be as shown in the copending application of H. T. Carter, Serial No. 586,480, filed May 22, 1956.

A call incoming on the line LC is evidenced by the lighting of a signal lamp 944 in a manner clearly set forth in the above-identified copending application, and is answered by the operation of the key KIC which is identified with the lighted lamp 944. This key operation bridges the telephone set at station 36 across the line LC for communication purposes. Upon learning that the calling party on line LC wishes to be connected with one or more of the stations of the intercommunicating system on a conference basis, the party at station 36 will operate the hold key H to place a hold condition on the central office or private branch exchange line LC in a manner fully described in the aforenoted copending application. The desired station or stations are then selected and signaled by the party at station 36 in a manner described hereinbefore and a local talking connection is established through previously described regular intercommunication operations. After the intercommunication connection is established, the line LC can be included at any time by the operation of the signaling key SKI.

When the key SKI is operated and the established intercommunication connection involves the secondary link L2, relay 730 operates in a circuit which includes ground at the contacts of key SKI, armature contacts 945 of relay 902 associated with the conferencing station 36, contacts 946 of relay 909, conductor 947, winding and Nos. 1 and 8 armature contacts of relay 730 and negative battery. Relay 730 in operating, locks by way of its Nos. 2 and 5 armature contacts, conductors 731 and 926, front contact and No. 1 armature of relay 616 to ground. At is No. 3 armature contacts, relay 730 connects the left hand windings of the transmission network TR (Fig. 7) across the tip and ring conductors 948 and 949 which, by way of contacts of keys KIC and H at station 36 are extended to the line LC, and at its Nos. 7 and 9 armature contacts, connects the right windings of transmission network TR across the conductors 733 and 734 which are connected to the secondary link L2 and to negative battery and ground by way of the windings of battery supply relay 625. Thus the central office or private branch exchange party on line LC is connected by way of the transmission network TR to the secondary link L2 to which, as assumed, the conference station or stations are now connected.

Had the intercommunicating station or stations to be conferenced been connected to the primary link L1, relay 909 at the conferencing station 36 will not be operated so that, when key SKI is actuated, relay 735 rather than relay 730 will operate in a circuit which includes ground at the contacts of keys SKI, armature contacts 945 of relay 902, armature contacts 950 of relay 909, conductor 951, the winding and Nos. 1 and 8 armature contacts of relay 735 and negative battery. Relay 735, in operating, locks by way of its Nos. 2 and 5 armature contacts, the No. 6 armature contacts of relay 730, conductor 815, the No. 5 armature contacts of relay 601, to ground. At its Nos. 3, 6 and 7 armature contacts, relay 735 connects the tip and ring conductors 948 and 949 through the transmission network TR to the conductors 737 and 738 which connect, respectively, with conductors 914 and 913, which, in turn, connect to the primary link L1 by way of the Nos. 1 and 2 armature contacts of relays 615 and 613, and thence by way of the windings of relay 601 to ground and negative battery. Thus the calling line LC is connected to the primary link L1 to which, as assumed, the conferenced stations of the intercommunicating system are connected.

In the event the secondary link L2 becomes available after the conference connection has been completed over the primary link L1, the transfer to the secondary link L2 is effected in a manner previously described. Actually, relay 612 operates to apply ground to conductor 623 which connects with conductor 640 and thence by way of the No. 4 armature contacts of relay 735 and the No. 4 armature contacts of relay 730 to the winding of relay 730 and its No. 1 armature contacts to negative battery by way of the No. 8 armature contacts of relay 730. Relay 730 operates in this circuit, locks and transfers control of the inward conference call from the primary link L1 to the secondary link L2 in a manner now apparent.

When using any of the different link connections, any local intercommunicating station may drop off during the process of the call. As soon as the last intercommunicating station releases, relay 735 or relay 730, as the case may be, releases and opens the connection to the central office or private branch exchange line LC.

*Off-premise extensions*

The system of this invention contemplates intercommunicating connections between local stations and stations which, because of their remote location with respect to the local stations of the system, are characterized as off-premise stations. Such connections between off-premise and local extensions are completed by way of the off-premise circuit OPC shown at the left of Fig. 3. For exemplary purposes station 1 is indicated in Fig. 8 to have optional wiring designated OP. It is understood that the wiring indicated at OP and the off-premise circuit OPC are required only in the event that station 1 is an off-premise station and not a so-called local station as it was elected to be in preceding descriptions. The off-premise stations are not arranged for lamps or key signaling.

The off-premise stations, such as station 1 in the instant description, are selected by a dialing operation at the calling station. For descriptive purposes it will be assumed that station 36, a local station, is the calling station and that station 1 is the off-premise called station. It will be assumed further that the two-digit code assigned to station 1 as an off-premise station is 2–0, and that the party at station 36 dials the required digits to effect the seizure of the line associated with off-premise station 1. It is not deemed necessary to repeat all the circuit operations resulting from the initiation of a call at the local station 36 and from the dialing of a station code. Suffice it to say that the selector circuit S and the selector switch A function in response to the dialing of the digits 2 and 0 in a manner such that the wiper or brush associated with the No. 2 terminal bank of switch A rests upon the switch terminal 315.

At the completion of the pulse trains, a ground signal causes relay 331 in the off-premise circuit OPC to operate in a circuit which includes negative battery, the No. 8 armature and front contact of relay 600, conductors 403 and 332, winding of relay 331, upper armature and back contact of relay 333, rectifier 334, conductor 330, No. 5 armature and front contact of relay 503, conductor C0, switch bank terminal 315, wiper of the No. 2 terminal bank of switch A, No. 2 armature and front contact of relay 308, back contact and No. 3 armature of relay 309, No. 3 armature and front contact of relay 301, conductor 316, back contact and No. 6 armature of relay 702, conductor 703, back contact and No. 3 armature of relay 612 and ground. Relay 331, operated, at its Nos. 3 and 4 armature contacts opens the transmission path between the off-premise and local stations; at its Nos. 2 and 6 armature contacts it connects ringing voltage to the tip and ring conductors of the off-premise station 1 by way of the wiring indicated at OP to operate a bridged ringer (or ring-up circuit if used) at the called station. Such a signal device is diagrammatically represented by the box RG at station 1. At its lower armature and front contact, relay 331 connects ground to conductor 340 and thence by way of conductor C12, armature contacts 837 of relay 803, back contact and armature of relay 800, winding and armature contacts 818 of relay 803, conductors 819 and 611, No. 9 armature and front contact of relay 600, conductor 610, No. 6 armature and front contact of relay 601, to negative battery. Relay 331 will release at the end of the normal 1½-second period provided by the selector circuit S and will reconnect the transmission path.

When the off-premise subscriber at station 1 answers the call signal, relay 341 operates over the closed station loop at station 1. Relay 341, operated, causes relay 333 in the off-premise circuit OPC to operate. Relay 601 also now operates.

Relay 601, operated, at its No. 5 armature contacts connects ground to conductor 617 and thence over conductor 815, armature contacts 954 of relay 909, left contact and armature of relay 903 at the calling station, winding of relay 902 and its armature contacts 901, conductor 819, conductor 611, No. 9 armature contacts of relay 600 to negative battery by way of the No. 6 armature contacts of relay 601. Relay 902 operates and connects the calling station 36 to the common battery feed relay in a manner previously described. Talking battery for the off-premise station 1 is now supplied by way of the windings of relay 341 and for the local station 36 by way of the windings of relay 601. Further circuit operation during talking and transfer to link L2 is as previously described.

The local station disconnects, as previously described, and the off-premise station, on disconnection, causes the release of relays 341 and 333. The last station to disconnect releases relay 601 of the primary link L1 or relay 625 of the secondary link L2, thus returning the circuit to normal.

When initiating a call, the off-premise station is connected to the selector circuit S under control of its associated relay 803 and relay 341 of the off-premise circuit OPC. Relay 341 operates on loop current and repeats the dial pulses at the calling station 1 which causes the selector switch A to operate in a manner previously described. Further circuit operations during the process of dial selection, talking and disconnection are as described hereinbefore.

What is claimed is:

1. In an intercommunicating telephone system, calling stations, called stations, first and second links for completing talking connections between calling and called stations, means responsive to the initiation of a call at a calling station for connecting a called station to said first link, means for signaling the called station, and means effective, incident to the response at the called station to the signaling thereof for connecting the calling station to the first link and for immediately thereafter transferring both the calling and called stations from the first link to the second link.

2. In a telephone intercommunicating system, calling stations, called stations, a first link, a second link, means controlled jointly by a calling station and a called station for completing a connection between such calling and called stations by way of said second link, means controlled jointly by another calling station and another called station for completing a connection between such other calling and called stations by way of said first link, and means automatically responsive to the release of the connection involving the said second link for transferring said other calling and called stations from said first link to said second link.

3. In a telephone intercommunicating system, calling stations, called stations, a first link, an idle second link, means responsive to the initiation of a call at a calling station for signaling a called station and connecting the called station to said first link, means effective incident to the response of the called station to the signaling thereof for connecting the calling station to said first link, and switching means responsive to the connection of said calling station to said first link for connecting both said calling and called stations to said idle second link.

4. In a telephone intercommunicating system, calling stations, called stations, a first link, a busy second link, means controlled jointly from a calling station and a called station for completing a communication connection between the calling and called stations by way of said first link, and means effective incident to said busy link becoming idle for transferring the said calling and called stations from said first link to said second link.

5. In a telephone intercommunication system, calling stations, called stations, a first link, a second link, means controlled jointly from a pair of calling and called stations for completing a connection between said pair of stations by way of said second link, means controlled jointly from a second pair of calling and called stations for completing a connection between said second pair of stations by way of said first link, and means responsive to the release of the connection involving said first pair of stations and said second link for automatically transferring said second pair of stations from said first link to said second link.

6. In a telephone intercommunicating system, calling stations, called stations, a first link, a second link, means controlled jointly from a first pair of calling and called stations for completing a connection between said first pair of stations by way of said first link and for automatically transferring said first pair of stations to said second link, means controlled jointly from a second pair of calling and called stations for completing a connection between said second pair of stations by way of said first link, means controlled from a third calling station for preparing a signaling circuit to a third called station during the busy condition of said first and second links, means automatically responsive to the release of the connection involving said first pair of stations and said second link for transferring said second pair of stations to said second link, and means responsive to such transfer for automatically completing the signaling circuit to the said third called station.

7. A telephone intercommunicating system according to claim 6 which includes means controlled from the said third called station following the completion of the said signaling circuit for completing a connection between said third calling and called stations by way of said first link.

8. In a telephone intercommunicating system, calling stations, called stations, a first link, a second link, means controlled jointly from a first pair of calling and called stations for completing a connection between said stations by way of said second link, means controlled jointly from a second pair of calling and called stations for completing a connection between said stations by way of said first link, a signal device at each of the stations of said first pair of stations, and means effective while the stations of said first pair of stations are included in the connection involving said second link and responsive to the initiation of a call at a third of said calling stations for operating the signaling devices at the stations of said first pair in a distinctive manner.

No references cited.